(12) United States Patent
Komatsu

(10) Patent No.: US 9,100,561 B2
(45) Date of Patent: Aug. 4, 2015

(54) IMAGE PICKUP APPARATUS THAT PROVIDES A CORRELATION IMAGE

(75) Inventor: Satoru Komatsu, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 151 days.

(21) Appl. No.: 13/607,889

(22) Filed: Sep. 10, 2012

(65) Prior Publication Data

US 2013/0063652 A1 Mar. 14, 2013

(30) Foreign Application Priority Data

Sep. 12, 2011 (JP) ................................. 2011-198194

(51) Int. Cl.
*H04N 5/225* (2006.01)
*H04N 5/232* (2006.01)
*H04N 5/235* (2006.01)
*H04N 5/353* (2011.01)

(52) U.S. Cl.
CPC ........... *H04N 5/2254* (2013.01); *H04N 5/2258* (2013.01); *H04N 5/2353* (2013.01); *H04N 5/23229* (2013.01); *H04N 5/353* (2013.01)

(58) Field of Classification Search
CPC .... H04N 5/235–5/2356; H04N 5/353–5/3537; H04N 5/35536; H04N 5/2256; H04N 13/02–13/0296; G03B 15/02–15/05; G03B 2215/05–2215/0596; G01B 11/24–11/225; G01C 3/00–3/32; G01S 17/02–17/58
USPC ........... 348/207.99, 207.1, 229.1, 230.1, 239, 348/255, 362–368, 370, 371; 600/322, 479; 356/3–22
See application file for complete search history.

(56) References Cited

U.S. PATENT DOCUMENTS

| 7,580,620 B2 | 8/2009 | Raskar et al. | |
| 2004/0036775 A1* | 2/2004 | Watson et al. | 348/207.1 |
| 2004/0239779 A1* | 12/2004 | Washisu | 348/239 |
| 2009/0306487 A1* | 12/2009 | Crowe et al. | 600/322 |
| 2012/0197137 A1* | 8/2012 | Jeanne et al. | 600/479 |

FOREIGN PATENT DOCUMENTS

| JP | 10-281868 A | 10/1998 |
| JP | 2003344901 A | 12/2003 |
| JP | 2009522825 A | 6/2009 |
| WO | WO 2011042851 A1 * | 4/2011 |

OTHER PUBLICATIONS

Ando et al., "Ultrafast Correlation Image Sensor: Concept, Design, and Applications", IEEE Workshop on CCD and Advanced Image Sensors, Bruges, Belgium, 1997.*

(Continued)

*Primary Examiner* — Dennis Hogue
(74) *Attorney, Agent, or Firm* — Rossi, Kimms & McDowell LLP

(57) ABSTRACT

An image pickup apparatus includes an image pickup element configured to provide a photoelectric conversion to an optical image formed by an image pickup optical system, a correlation image acquirer configured to obtain a product between a pixel value of an image output from the image pickup element and a representative value of a reference signal that fluctuates during an exposure time period for each of a plurality of divided time periods made by dividing the exposure time period by a predetermined division number, and a correlation image calculator configured to obtain an output from the image pickup element and to calculate a sum of the product for the exposure time period as a correlation image.

14 Claims, 11 Drawing Sheets

(56) References Cited

OTHER PUBLICATIONS

Kimachi et al., "Spectral matching imager using correlation image sensor and AM-coded multispectral illumination", Proceedings of SPIE—IS&T Electronic Imaging, SPIE vol. 5017, 2003.*

Kimachi et al., "Time-Domain Correlation Image Sensor: CMOS Design and Integration of Demodulator Pixels", Optoelectronic Integrated Circuits IV, Proceedings of SPIE vol. 3950, 2000.*

Ando et al., "Correlation Image Sensor: Two-Dimensional Matched Detection of Amplitude-Modulated Light", IEEE Transactions on Electron Devices, vol. 50, No. 10, Oct. 2003.*

* cited by examiner

IMAGE PICKUP APPARATUS THAT PROVIDES A CORRELATION IMAGE

BACKGROUND OF THE INVENTION

1. Field of the Invention

The present invention relates to an image pickup apparatus.

2. Description of the Related Art

In the field of the optical flow, it is necessary to obtain motion information of an object, but when a plurality of images are obtained at a high speed at the same exposure time, a large storage capacity and high-speed processing become required.

Accordingly, Japanese Patent No. 3643210 proposes a method for presenting a correlation image representing a time correlation between incident light and a reference signal by utilizing an image sensor configured to provide a reference signal to photoelectrically converted current and to time-integrate and output the modulated current. Japanese Domestic Publication No. 2009-522825 proposes a method for encoding by opening and closing a shutter at irregular time intervals in obtaining one image, and for decoding the obtained, coded image so as to remove blurs in the image. JP 2003-344901 proposes a method for modulating a light quantity using a spatial light modulator instead of an exposure controlling filter for the image pickup.

However, Japanese Patent No. 3643210 utilizes the special image sensor, and thus the production cost increases. In addition, since one photodiode needs a plurality of capacitors, one pixel becomes large and a high resolution becomes difficult. Neither Japanese Domestic Publication No. 2009-522825 nor Japanese Patent Laid-Open No. 2003-344901 addresses an acquisition of information of a variation with time of the object.

SUMMARY OF THE INVENTION

The present invention provides an image pickup apparatus that includes a universal image sensor and can acquire a high-resolution image and information of a variation with time of an object.

An image pickup apparatus according to the present invention includes an image pickup element configured to provide a photoelectric conversion to an optical image formed by an image pickup optical system, a correlation image acquirer configured to obtain a product between a pixel value of an image output from the image pickup element and a representative value of a reference signal that fluctuates during an exposure time period for each of a plurality of divided time periods made by dividing the exposure time period by a predetermined division number, and a correlation image calculator configured to obtain an output from the image pickup element and to calculate a sum of the product for the exposure time period as a correlation image.

Further features of the present invention will become apparent from the following description of exemplary embodiments with reference to the attached drawings.

DESCRIPTION OF THE EMBODIMENTS

An image pickup apparatus of this embodiment includes a sub-frame correlation image acquirer configured to acquire a sub-frame correlation image, and a correlation image calculator configured to obtain an output from an image pickup element and to calculate a correlation image as a sum of the sub-frame correlation images for an exposure time period.

Herein, the sub-frame correlation image is a product between a pixel value of an image output from the image pickup element and a representative value of a reference signal in one of a plurality of divided time periods made by dividing an exposure time period by a predetermined division number. The correlation image calculator may serve as a sub-frame correlation image acquirer or an exposure controller and a shutter/light quantity modulator which will be described later may serve as the sub-frame correlation image acquirer. The sub-frame correlation image may not be generated for each division time period, and may be generated in one of the plurality of divided time periods.

According to this embodiment, the correlation image calculator receives an output from the image pickup element, and calculates a correlation image outside the image pickup element. Since the correlation image is not calculated in the image pickup element, it is unnecessary to use a special image sensor for the image pickup element and the cost increase can be prevented.

Referring now to the accompanying drawings, a description will be given of embodiments of the present invention.

First Embodiment

Figure 1A:
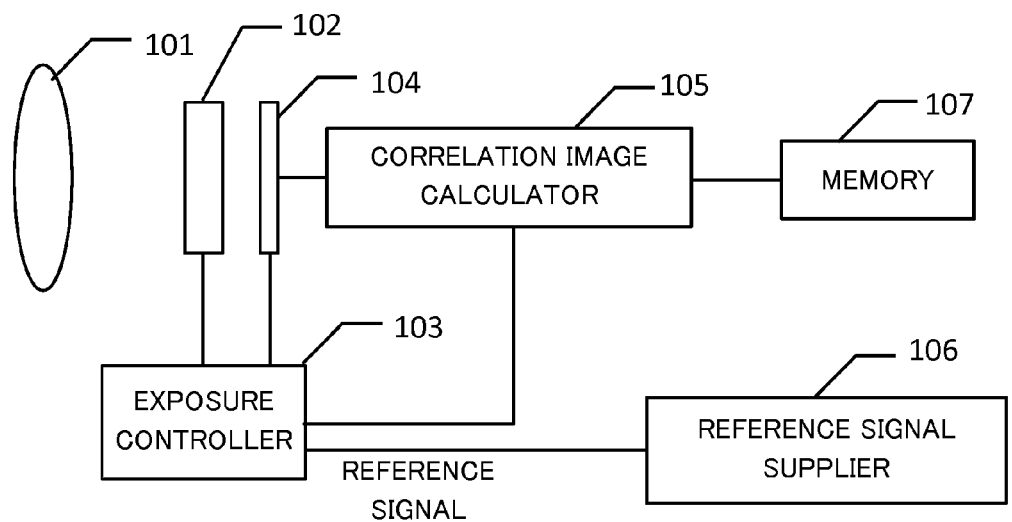
FIGS. 1A and 1B are block diagrams of image pickup apparatuses according to a first embodiment of the present invention.
Figure 1B:
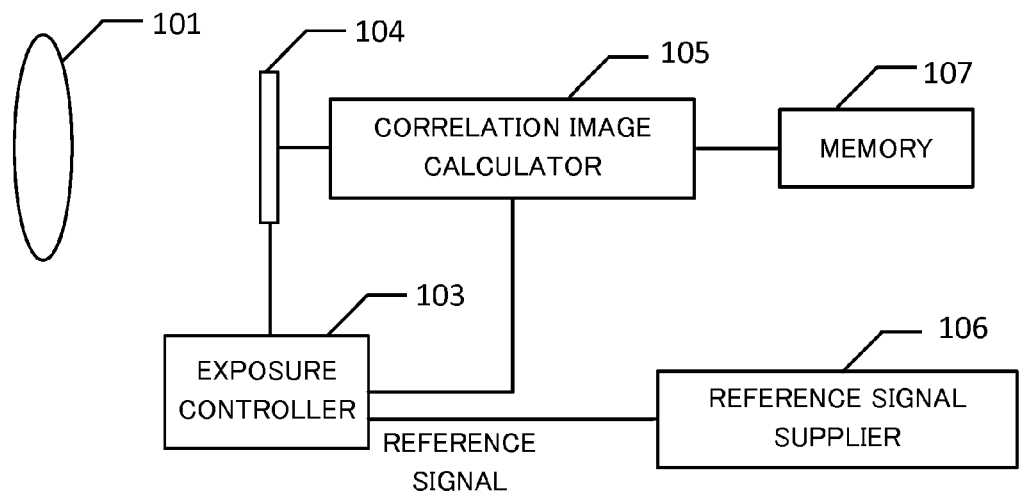

FIGS. 1A and 1B illustrate block diagrams of different structures of image pickup apparatuses according to a first embodiment.

In FIG. 1A, reference numeral 101 denotes an image pickup optical system configured to form an optical image of an object, and to form an image of incident light on an image sensor 104. Reference numeral 102 denotes a mechanical shutter configured to determine an exposure dose upon the image sensor 104, and to open and close at high and different speeds. Reference numeral 103 denotes an exposure controller configured to control the shutter speed and the opening and closing timings of the shutter.

The image sensor 104 is an image pickup element configured to provide a photoelectric conversion to an optical image, and to read an image at a high speed in synchronization with opening and closing of the mechanical shutter 102. Reference numeral 105 denotes a correlation image calculator configured to calculate a correlation image which will be described later, based upon a signal from the image sensor 104. The exposure controller 103 and the correlation image calculator 105 can be implemented as a processor (microcomputer).

Reference numeral 106 denotes a reference signal supplier configured to supply a reference signal to the exposure controller 103. The reference signal supplier 106 includes a connector to the outside or a memory that stores the reference signal. Reference numeral 107 denotes a memory (storage) configured to store a correlation image.

FIG. 1B is a block diagram of the image pickup apparatus having the configuration illustrated in FIG. 1A from which the mechanical shutter 102 is eliminated. In this case, the exposure controller 103 controls the image sensor 104 and releases an electronic shutter at a high speed configured to determine the exposure dose upon the image sensor 104 thereby providing image pickup similar to that in the structure of FIG. 1A.

A description will now be given of the correlation image. The correlation image is an image obtained by the time correlation between the reference signal and a usual captured image that is obtained when incident light passes the image pickup optical system 101, and photoelectrically converted by the image sensor 104.

A correlation image $I_{i,j}(t)$ is expressed by the following expression where $f_{i,j}(t)$ is a pixel value of an image output from the image sensor 104 at a pixel (i, j), g(t) is a reference signal, and T is one frame time period. This is an integral value of a product between the pixel value and the reference signal in an exposure time period (one frame time period).

$$I_{i,j}(t) = \int_t^{t+T} f_{i,j}(t) g(t) dt \quad \text{Expression 1}$$

Expression 1 can be discretely expressed as follows:

$$I_{i,j}(t) = \Sigma_t^{t+T} f_{i,j}(t) g(t) \quad \text{Expression 2}$$

In other words, a correlation image can be obtained by dividing the exposure time period into micro time periods $\Delta t$, and by calculating an output $f_{i,j}(t+n\Delta t)$ of the image sensor 104 at $t+n\Delta t$ and the reference signal value $g(t+n\Delta t)$. Now a sub-frame is defined as each image captured for each micro time period when the exposure time period is divided into micro time periods, and n means a number assigned to the sub-frame.

In operation, the light incident from the object forms an image on the image sensor 104 through the image pickup optical system 101 while the shutter opens. The image pickup optical system 101 and the image sensor 104 can utilize those used for the usual image pickup apparatus, but the image sensor 104 is configured to provide high-speed reading and to serve as a high-speed electronic shutter.

Figure 2:
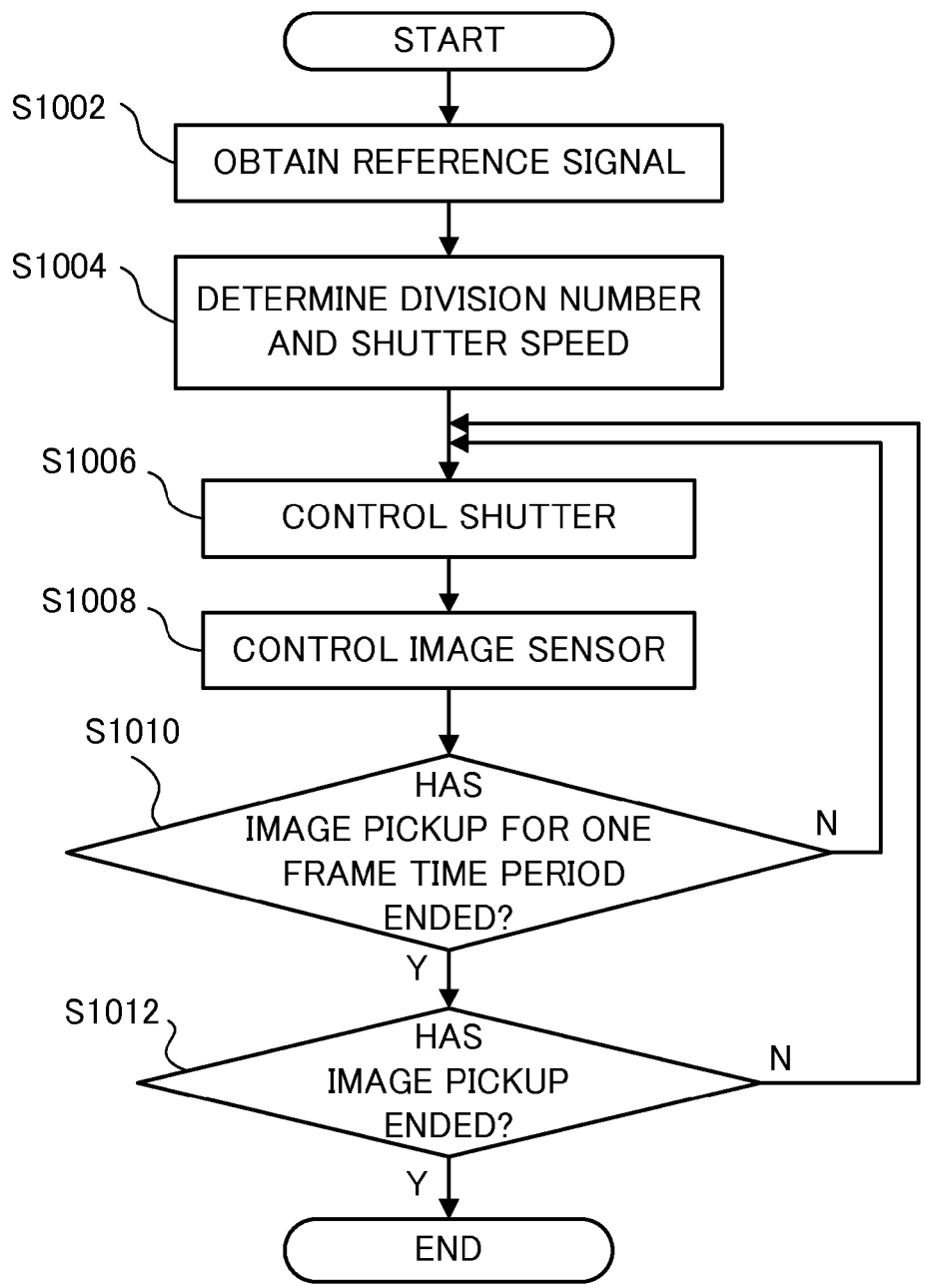
FIG. 2 is a flowchart of an operation of an exposure controller illustrated in FIGS. 1A and 1B according to the first embodiment.

The exposure controller 103 controls the entire image pickup apparatus based upon the reference signal. FIG. 2 is a flowchart illustrating an operation of the exposure controller 103. In FIG. 2, "S" stands for the step, and this is true of other flowcharts.

Figure 3:
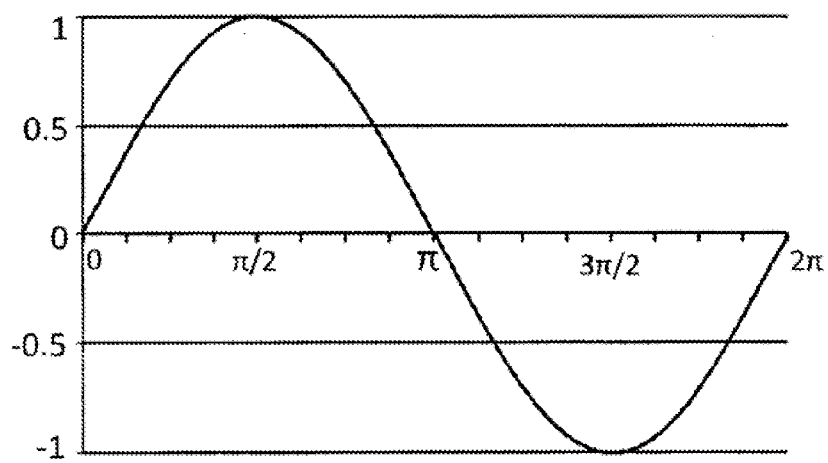
FIG. 3 is a view of an illustrative reference signal supplied to the exposure controller illustrated in FIGS. 1A and 1B according to the first embodiment.

When the image pickup starts, the exposure controller 103 initially obtains the reference signal from the reference signal supplier 106 (S1002). The reference signal is a signal that fluctuates during the exposure time period, and can use a sinusoidal signal in which the exposure time period corresponds to one period as illustrated in FIG. 3.

The "exposure time period," as used herein, corresponds to a shutter speed that provides an optimal exposure time period for a still image, and one frame time period for a motion image (which is a time period for one still image in the motion image). The one frame time period in the motion image is generally 1/30 or 1/60 seconds. The shape of the reference signal is not limited, and the number of reference signals is not limited to one. A description will now be given of an example in which the sine wave illustrated in FIG. 3 is the reference signal, and the correlation images are continuously obtained in the motion image.

When receiving the reference signal g(t) (S1002), the exposure controller 103 determines the division number in one frame time period based upon the reference signal g(t), and calculates the shutter speed of the sub-frame (S1004). The determined division number with the information of the reference signal g(t) is sent to the correlation image calculator 105. For example, the exposure controller 103 sets the division number so that the sampling number is equal to or more than twice as high as the maximum frequency of the reference signal in accordance with the sampling theorem. The unit that determines the division number may not be the exposure controller 103, but the division number may be input from the outside.

When the reference signal g(t) is input from the outside, the frequency is unknown and the division number cannot be simultaneously determined. In that case, the frequency may be analyzed by obtaining the reference signal for one frame time period and the division number may be determined. Thus, the reference signal for motion image pickup may be repetitively input in one frame. The reference signal that is different every one frame time period may be input. In that case, the division number may be determined according to the maximum frequency and the maximum frequency may be input.

Next, the micro time period (derivative time) $\Delta t$ is calculated based upon the determined division number and one frame time period, and the shutter speed is calculated accordingly. The shutter speed is defined as a speed in which the shutter releases once for $\Delta t$, and the shutter speed that provides the maximum exposure dose during that period may be set when the noises are considered.

Figure 4:
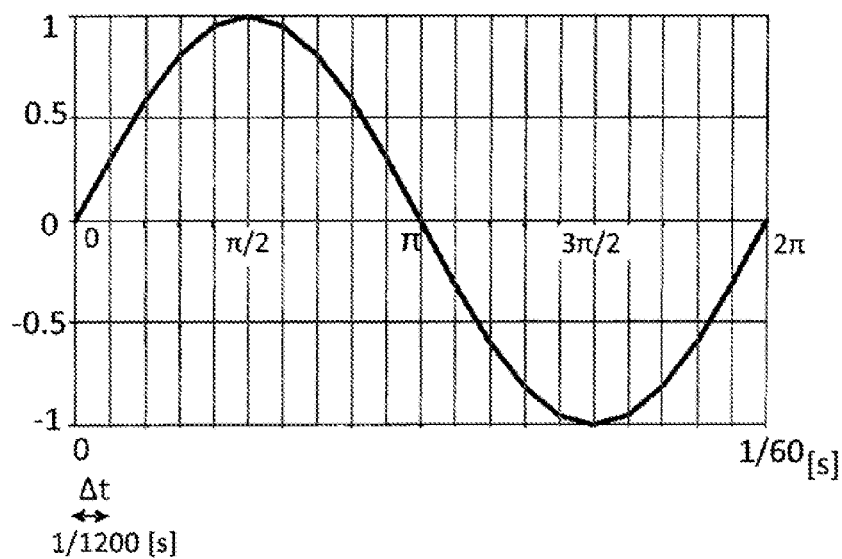
FIG. 4 is a view of a time-divided reference signal illustrated in FIG. 3 according to the first embodiment.

The shutter speed is constant during one frame rather than being variable for each division, and the shutter is repetitively released at that speed. For example, FIG. 4 illustrates one period of the reference signal g(t) divided by twenty. When one frame time period is 1/60 seconds, the micro time period Δt becomes 1/1200 seconds. When the time lag of the shutter is 1/12000 seconds, the shutter speed becomes 3/4000 seconds so as to provide the maximum exposure for Δt.

Figure 5:
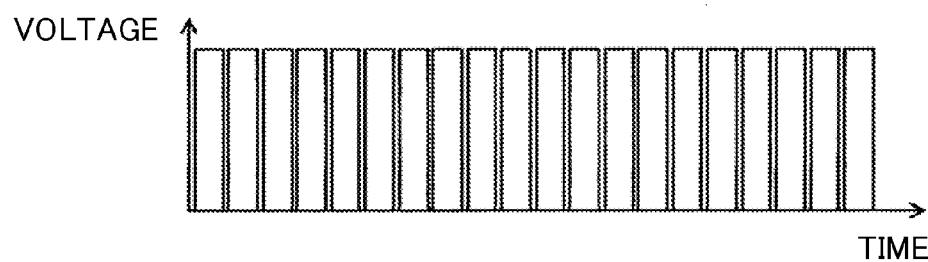
FIG. 5 is a view for explaining opening/closing timings of a shutter illustrated in FIGS. 1A and 1B according to the first embodiment.

Next, the exposure controller 103 controls opening and closing of the mechanical shutter 102 at regular intervals illustrated in FIG. 5 (or so as to maintain the shutter speed constant during the sub-frame time period) utilizing the shutter speed determined in S1004 (S1006).

Herein, FIG. 5 is a view illustrating the opening/closing timings of the shutter. The ordinate axis in FIG. 5 denotes the voltage value supplied to a shutter driver (not illustrated), and the abscissa axis denotes the time. The shutter opens at a leading edge, and the shutter closes at the trailing edge. The pulse width corresponds to the shutter speed. In FIG. 1B, the electronic shutter of the image sensor 104 is controlled.

Next, the electronic controller 103 controls the image sensor 104 so as to photoelectrically convert the incident light in synchronization with the shutter, and to output the exposed sub-frame image to the correlation image calculator 105 (S1008).

Next, the exposure controller 103 determines whether the image pickup for one frame has ended based upon the predetermined division number (S1010). When it has not yet ended (N of S1010), the flow returns to S1006 and the image pickup is performed by controlling the shutter and the image sensor 104. When it has ended (Y of S1010), one frame ends.

Next, the exposure controller 103 determines whether the image pickup has ended (S1012), and when the image pickup is to continue (N of S1012), the flow returns to S1006 and the processing is repeated. When the image pickup is to end (Y of S1012), the image pickup is completed.

The image sensor 104 is structurally similar to the image sensor in the usual image pickup apparatus, and controlled by the exposure controller 103. An image obtained by photoelectrically converting incident light in accordance with opening and closing of the shutter is output to the correlation image calculator 105. Since this embodiment does not require the special time correlation image sensor disclosed in Japanese Patent No. 3643210, an increase of the production cost can be restrained.

The image sensor 104 needs to serve as a high-speed electronic shutter and to provide high-speed reading. While the image sensor used for the normal motion image pickup captures an image at 60 fps, this embodiment divides one frame and captures an image at each divided time. When the reference signal g(t) in which one period corresponds to one frame is used for image pickup, at least two divisions are necessary for image pickup so as to reproduce the reference signal g(t). As described later, when modulated motion images are captured with twenty divisions, an image sensor that can take an image at 1200 fps is necessary.

The correlation image calculator 105 utilizes the division number and the reference signal g(t) sent from the exposure controller 103, and outputs as a correlation image a sum of sub-frame images for the exposure time period, each of which is captured by the image sensor 104 by dividing one frame.

Figure 6:
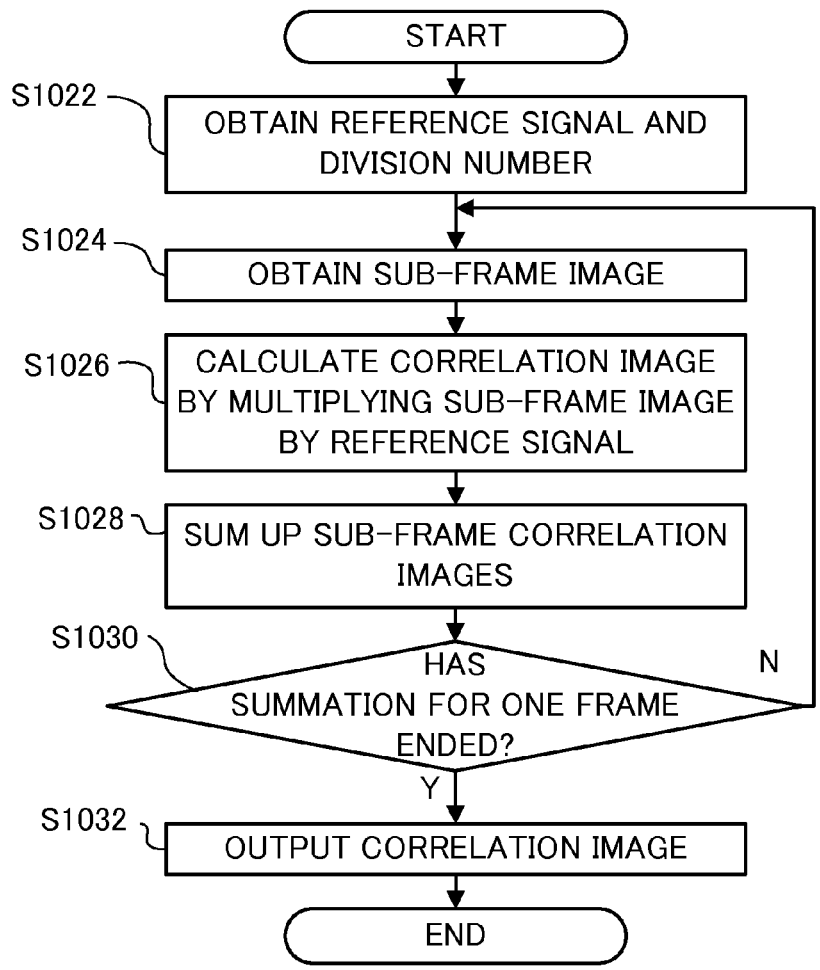
FIG. 6 is a flowchart for explaining an operation of a correlation image calculator illustrated in FIGS. 1A and 1B according to the first embodiment.

FIG. 6 is a flowchart for explaining an operation of the correlation image calculator 105 for one frame.

Initially, the correlation image calculator 105 obtains the reference signal g(t) and the division number in one frame from the exposure controller 103 (S1022).

Next, the correlation image calculator 105 obtains the sub-frame image from the image sensor 104 (S1024). The sub-frame image is an A/D-converted digital image, and a γ correction or the like is set to a constant value irrespective of the sub-frame image.

Next, the correlation image calculator 105 calculates a sub-frame correlation image $C_n(t_n)$ at time $t_n$ by multiplying a sub-frame image $I_n(t_n)$ that is exposed for Δt from n-th time $t_n$ in one frame by a reference signal value $g(t_n)$ at corresponding time (S1026). Thus, in this case, the correlation image calculator 105 serves as the sub-frame correlation image acquirer.

$C_n(t_n)$ is given by the following expression:

$$C_n(t_n) = I_n(t_n)g(t_n) \qquad \text{Expression 3}$$

For example, for the reference signal in FIG. 4 in which a sine wave has one period corresponding to one frame and is divided into twenty, the reference signal value $g(t_1)$ at the first sub-frame image pickup start time $t_1$ is 0. When it is multiplied by the sub-frame image $I_1(t_1)$, the sub-frame correlation image $C_n(t_n)$ becomes 0.

While this example utilizes the reference signal value at the sub-frame image pickup start time, the reference signal varies during the divided micro time period. Hence, the reference signal value significantly varies when this division number is small. When the division number is small, the reference signal value at the intermediate time in the micro time period may be set to the representative value.

More specifically, a phase change is π/10 in the micro time period Δt for the twenty divisions, and thus the reference signal value $g(t_1)$ in the first sub-frame image in one frame becomes a reference signal value sin(π/20) of an intermediate phase π/20 in the micro exposure time period. When the division number is sufficiently large, the sub-frame end time may be used. When the division number is small, an average value of the reference signal value for Δt may be set to the representative value.

Next, the correlation image calculator 105 sums up the sub-frame correlation images $C_n(t_n)$ calculated in S1026 and stores the result in the memory 107 used to store the correlation image (S1028). In other words, when the second sub-frame correlation image $C_2(t_2)$ is sent, it is added to the first sub-frame correlation image $C_1(t_1)$ and stored as the correlation image C.

However, when the sub-frame correlation images in one frame are simply summed up, as the division number (sub-frame number) increases, the summation becomes large and causes the overflow. Therefore, the sub-frame correlation image is divided by a predetermined division number and added. In other words, the correlation image C for one frame is given as follows where n is the sub-frame number:

$$C = \sum_n \frac{C_n(t_n)}{n} \qquad \text{Expression 4}$$

Next, the correlation image calculator 105 determines whether it has obtained all divided images for one frame based upon the division number obtained in S1022 (S1030), and when it has not reached the one frame (N of S1030), the flow returns to S1024.

On the other hand, the correlation image calculator 105 ends one frame (S1032) by outputting the correlation image stored in the memory 107 in S1028 when it has reached the one frame (Y of S1030). Since the correlation image is made by summing up the sub-frame correlation images, one correlation image is output for one frame when one reference signal g(t) is input.

Figure 7:
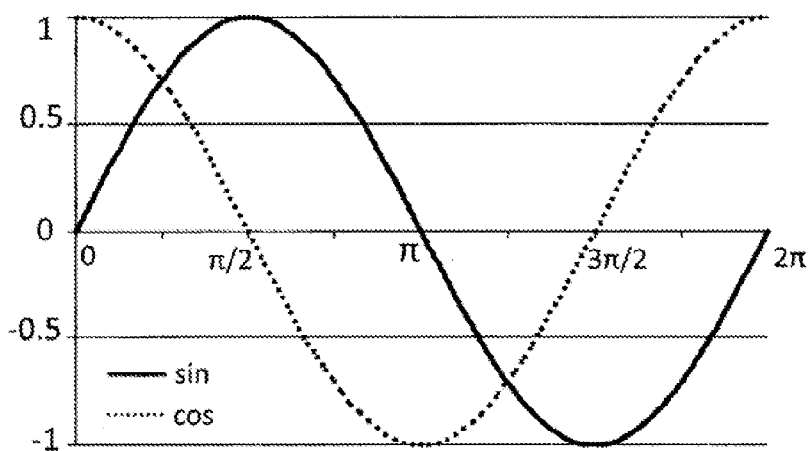
FIG. 7 is a view of a variation of the reference signal illustrated in FIG. 3 according to the first embodiment.

As described above, a plurality of reference signals may be used: For example, as illustrated in FIG. 7, a signal having an offset phase of the sinusoidal signal illustrated in FIG. 3 may be prepared, and the correlation image may be output by correlating the same sub-frame image with the different reference signals.

In this case, a number of memories 107 which corresponds to the number of types of the input reference signals are prepared, the sub-frame image is multiplied by a reference signal value for each reference signal, and the sub-frame correlation images are summed up and stored. As a result, a number of correlation images which is the number of reference signals are calculated and output.

In the meanwhile, setting g(t)=1 to the reference signal is equivalent to divisionally capturing usual images for one frame (intensity image). Therefore, a usual image can be simultaneously output.

As discussed, this embodiment can obtain a correlation image without using a special image sensor disclosed in Japanese Patent No. 3643210, and prevent a cost increase of the image pickup apparatus.

A description will now be given of a variation of the first embodiment. While the image pickup apparatus is structurally the same as that illustrated in FIG. 1, operations of the exposure controller 103 and the correlation image calculator 105 are different. The variation controls the shutter speed and captures an image so as to provide the same effect in which the sub-frame image exposed by a micro time period with a constant shutter speed is multiplied by the reference signal. As a result, the shutter speed is modulated by the representative value of the reference signal. The correlation image for one frame is calculated by summing up the obtained sub-frame images in which the exposure time periods are different.

More specifically, the operational flow of the exposure controller 103 is similar to that of FIG. 2, but the content in S1004 is different. The first embodiment determines the constant shutter speed for the image pickup so as to provide the maximum exposure time period in the micro time period (divided time period) calculated based upon one frame time period and the division number. On the other hand, according to the variation, the shutter has a shutter speed that is variable in the micro time period, the exposure dose is varied by the exposure time period, and consequently the same signal value is obtained as if it is multiplied by the reference signal.

More specifically, the maximum exposure time period in the micro time period is normalized to 1, and the maximum value of the reference signal is also normalized to 1. For example, assume the reference signal illustrated in FIG. 4. Since the reference signal varies in the divided micro time period, the representative value that represents the reference signal value is determined in this micro time period, and the shutter speed is determined based upon the result.

For example, the reference signal value of the micro time period at the intermediate time is set to the representative value. Since the phase difference is $\pi/10$, the reference signal value for the first sub-frame image in one frame is a value $\sin(\pi/20)$ at the intermediate phase $\pi/20$ in the micro exposure time period.

Figure 8:
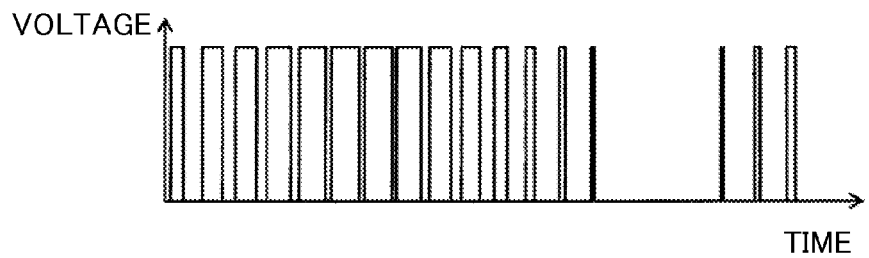
FIG. 8 is a view for explaining a variation of the opening/closing timings of the shutter according to the first embodiment.

The shutter speed at this time becomes a time period changing in proportion to a reference signal value or the maximum exposure time period×$\sin(\pi/20)$, and each shutter speed for one frame is expressed by the opening/closing timings illustrated in FIG. 8. The ordinate axis and abscissa axis in FIG. 8 are similarly defined as FIG. 5. The reference signal value is normalized between 0 and 1 when it is used. Since the shutter speed has a limitation, the reference signal value may be a discrete value that matches the fastest shutter speed. The representative value of the reference signal may be an average value of the reference signal values in the micro time period.

In the variation, the exposure controller 103 and the shutter serve as the sub-frame correlation image acquirer.

As discussed above, a plurality of reference signal values may be used, but it is impossible to simultaneously realize the shutter speeds for a plurality of reference signal values. The reference signal is selected in order, and the shutter speed is determined based upon the signal value at that time.

Figure 9:
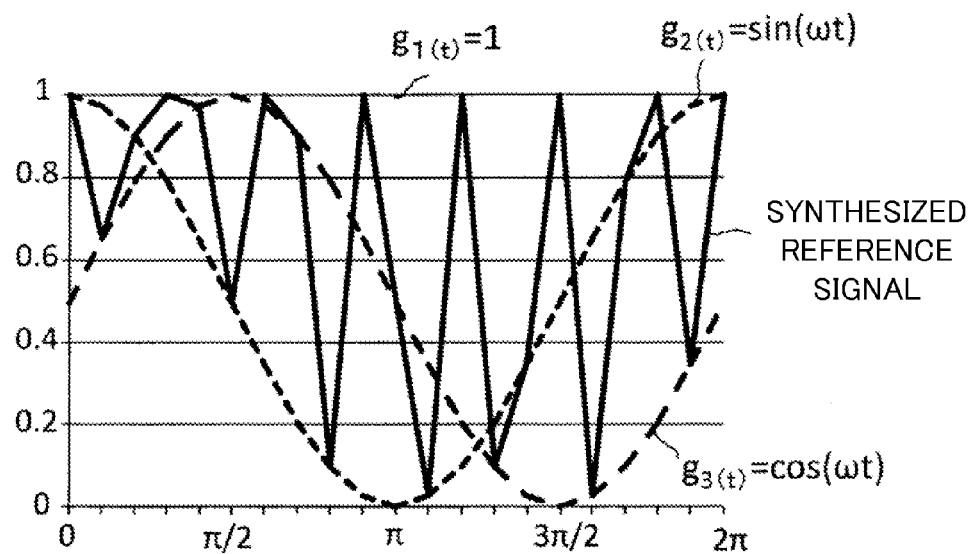
FIG. 9 is a view illustrating a time division synthesis of a plurality of types of reference signals according to the first embodiment.

FIG. 9 illustrates time-divided reference signals when three reference signals $g_1(t)=1$, $g_2(t)=\sin(\omega t)$, and $g_3(t)=\cos(\omega t)$ are input. The reference signal is generated by synthesizing two different types of reference signals selected for at least two different sub-frames.

Figure 10:
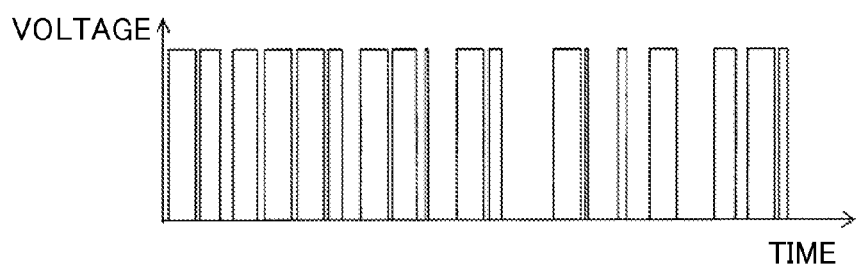
FIG. 10 is a view for explaining the opening/closing timings of the shutter corresponding to FIG. 9 according to the first embodiment.

For the first sub-frame, $g_1(t)=1$ (fixed value) is selected as the reference signal value. For the second sub-frame, $g_2(t)=\sin(\omega t)$ is selected as the reference signal value. For the third sub-frame, $g_3(t)=\cos(\omega t)$ is selected as the reference signal value. A solid line illustrates the synthesized reference signal value as a result of the repetitions of this procedure. When the synthesized reference signal value is converted into the shutter speed, the opening/closing timings illustrated in FIG. 10 are obtained. The ordinate axis and the abscissa axis in FIG. 10 are similarly defined as FIG. 5.

At this time, the sub-frame image output from the image sensor 104 controlled in S1034 to the correlation image calculator 105 is correlated with the reference signal value by the shutter speed, and the sub-frame image becomes the sub-frame correlation image.

Figure 11:
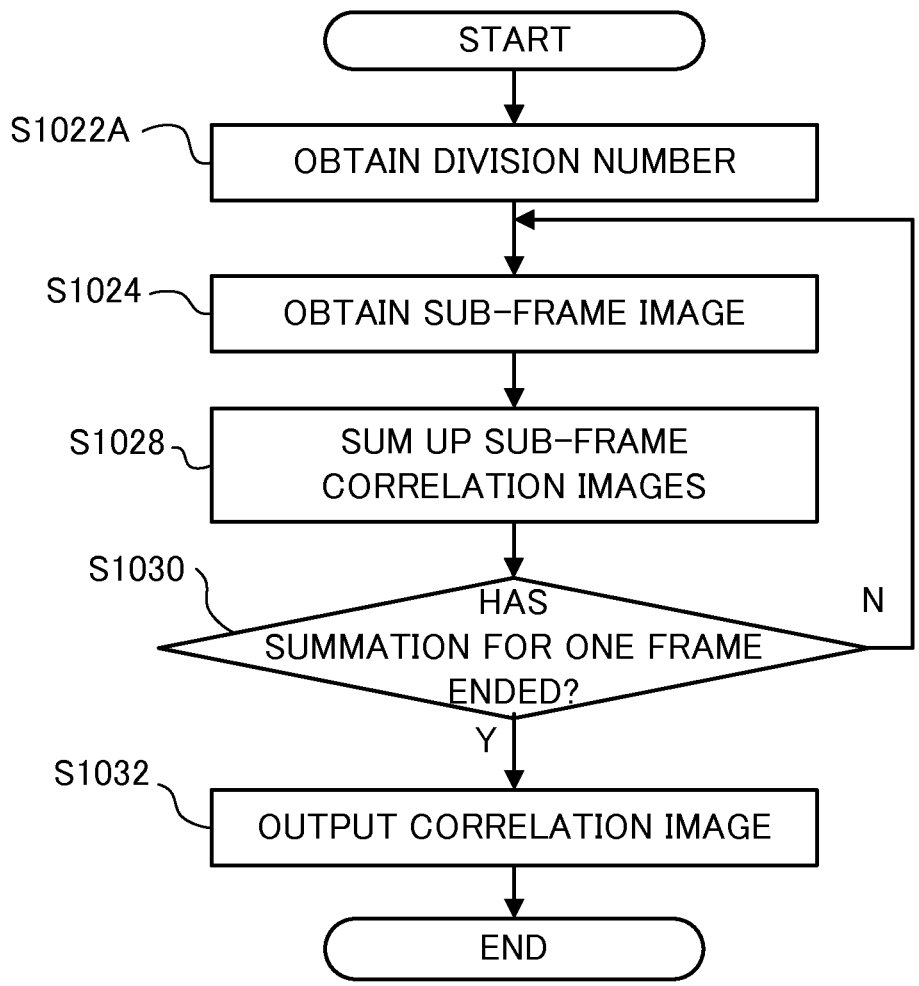
FIG. 11 is a flowchart for explaining an operation of a correlation image calculator illustrated in FIGS. 1A and 1B according to the variation of the first embodiment.

FIG. 11 is a flowchart for explaining an operation of the correlation image calculator 105 in this variation, and those steps similar to FIG. 6 are designated by the same reference numerals.

Initially, the correlation image calculator 105 obtains the division number in one frame from the exposure controller 103 (S1022A), but does not have to obtain the reference signal. Next, the reference image calculator 105 obtains the sub-frame image from the image sensor 104 (S1024). In S1024, the sub-frame image is the sub-frame correlation image, and thus S1026 is not performed.

Next, the correlation image calculator 105 sums up the sub-frame correlation images, each of which is obtained in S1024, for the exposure time period and stores the result in the memory 107 used to store the correlation image (S1028). The following flow is similar to those of S1030 and 1032 in the first embodiment.

As discussed, this variation also can obtain a correlation image without using a special image sensor disclosed in Japanese Patent No. 3643210, and prevent a cost increase of the image pickup apparatus.

Second Embodiment

Figure 12A:
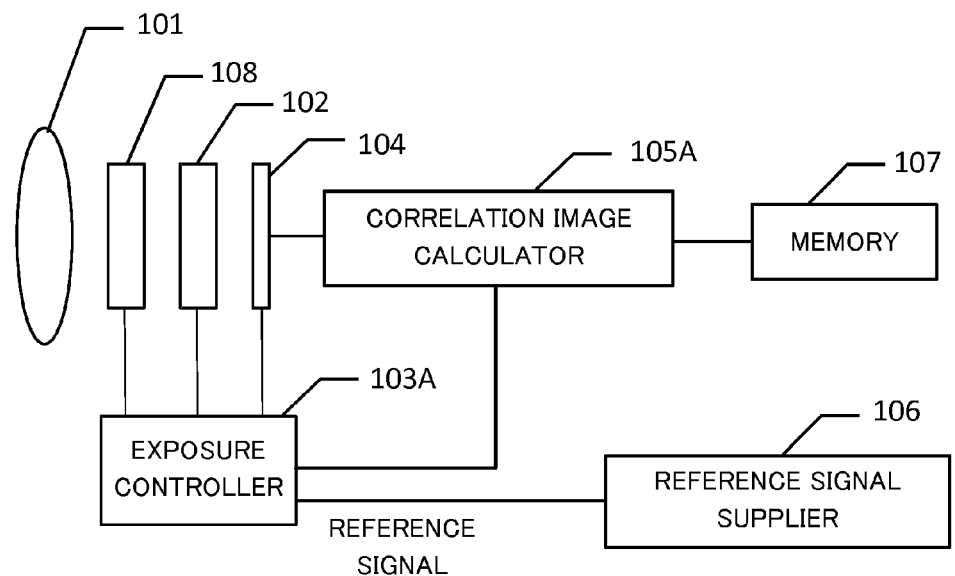
FIGS. 12A and 12B are block diagrams of image pickup apparatuses according to a second embodiment of the present invention.
Figure 12B:
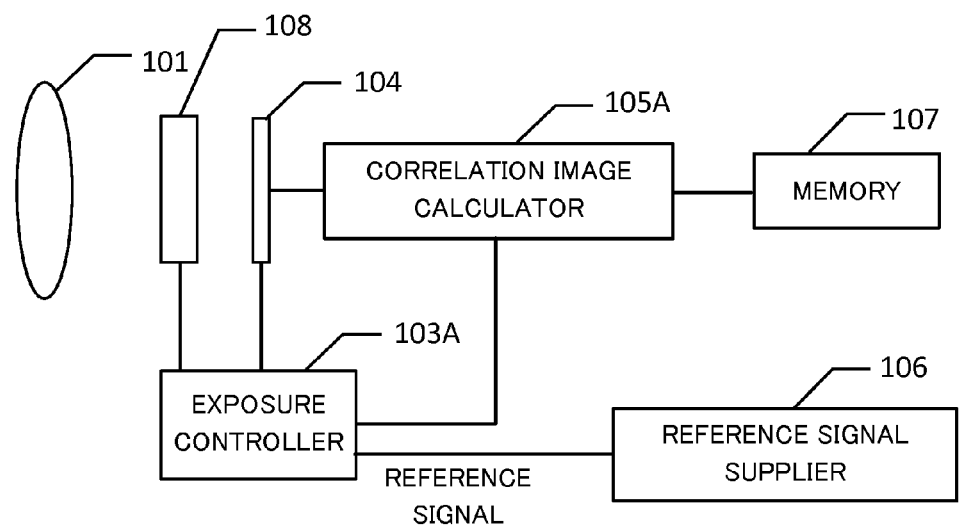

FIGS. 12A and 12B are block diagrams of different structures of the image pickup apparatus according to a second embodiment. Those elements which are corresponding elements in FIGS. 1A and 1B, are designated by the same reference numerals. The image pickup apparatus illustrated in FIG. 12A is different from that illustrated in FIG. 1A in that a light quantity modulator 108 is arranged between the image pickup optical system 101 and the mechanical shutter 102, and configured to change the light quantity of the incident light upon the image sensor 104. FIG. 12B has a configuration similar to FIG. 12A but there is no mechanical shutter 102 as in FIG. 1B.

The exposure controller 103A is structurally similar to the exposure controller 103, but the operational flow illustrated in FIG. 2 is partially different. The image sensor 104 is an image sensor for a universal image pickup apparatus similar to the first embodiment. While the correlation image calculator 105A is structurally similar to the correlation image calculator 105, the operational flow illustrated in FIG. 6 is partially different.

This embodiment acquires the correlation image by modulating the incident light quantity in accordance with the reference signal utilizing the light quantity modulator 108.

Figure 13:
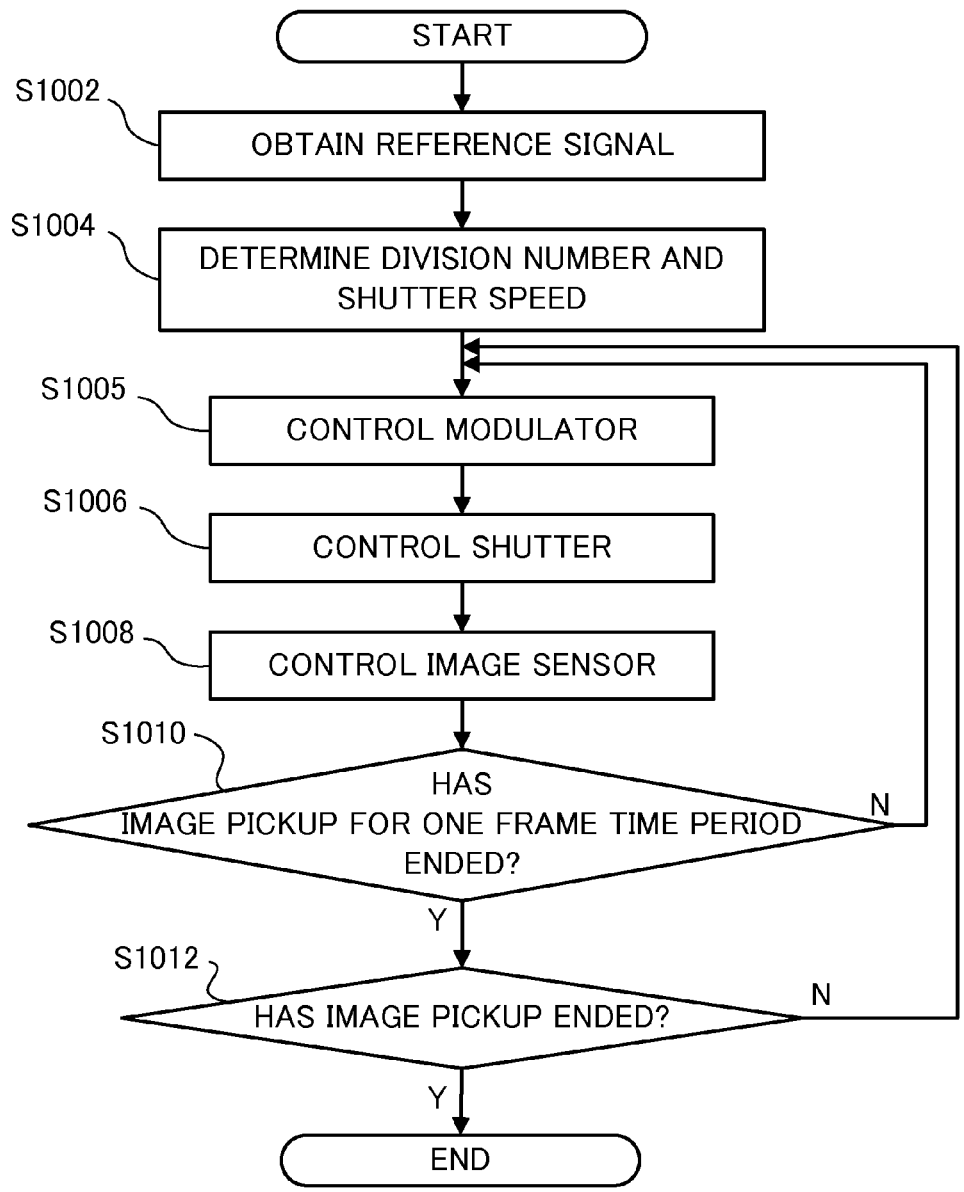
FIG. 13 a flowchart of an operation of an exposure controller illustrated in FIGS. 12A and 12B according to the second embodiment.

FIG. 13 is a flowchart illustrating an operation of the exposure controller 103, and those steps which are corresponding steps in FIG. 2 are designated by the same reference numerals. FIG. 13 is different from FIG. 2 in that FIG. 13 has S1005. Similar to FIG. 2, the illustrative reference signal may be as illustrated in FIGS. 3 and 4.

After S1002 and S1004 are performed similar to FIG. 2, the exposure controller 103A controls the transmitting light quantity (modulation amount) by controlling the current (or voltage) in the light quantity modulator 108 for each sub-frame in accordance with the reference signal (S1005).

For that purpose, it is necessary to normalize the transmittance of the light quantity modulator 108 (a ratio of the light quantity incident upon the image sensor 104) so that its maximum value is 1 and its minimum value is 0 so as to correspond the transmittance to the maximum value and the minimum value of the reference signal g(t). Since the reference signal g(t) may have a negative value, the absolute value of the reference signal value is normalized between 0 and 1 and the image is stored with a minus code. The exposure controller 103A calculates a value of the reference signal $g(t_n)$ at time $t_n$ and controls the current (or voltage) in the light quantity modulator 108 so as to provide the transmittance corresponding to the reference signal $g(t_n)$. In this embodiment, the exposure controller 103A and the light quantity modulator 108 serve as the sub-frame correlation image acquirer.

Figure 14:
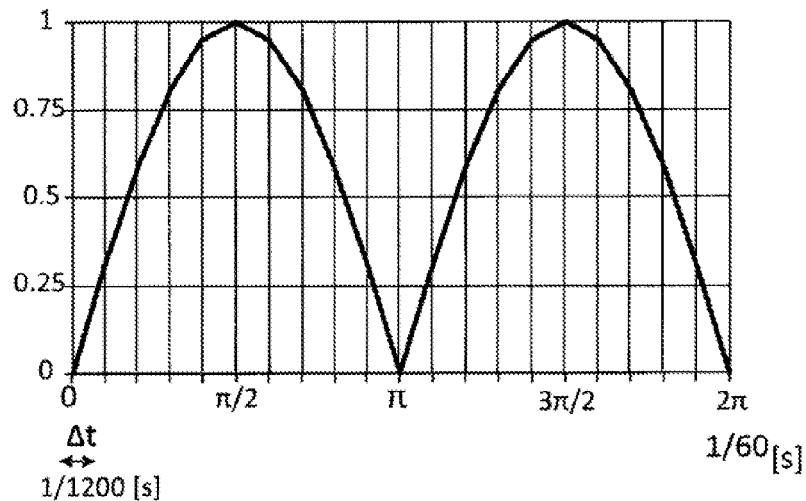
FIG. 14 is a view of a normalized reference signal according to the second embodiment.

Herein, assume the normalized reference signal illustrated in FIG. 14. The sine wave having one period corresponding to one frame is used and the division number is twenty. Since the transmittance of the light quantity modulator 108 cannot be negative, the absolute value of the sine wave having amplitude between −1 and 1 is normalized between 0 and 1. Since the reference signal value $g(t_1)$ is 0 at the first sub-frame image pickup start time $t_n$, the exposure controller 103A provides such control that the transmittance of the light quantity modulator 108 can be 0. Similar to the first embodiment, the representative value of the reference signal value can be set in accordance with the division number.

Thereafter, S1006 to S1012 follow similar to FIG. 2, and the sub-frame image output in S1008 is the sub-frame correlation image since it is correlated with the reference signal by the light quantity modulator 108. The sub-frame correlation image is expressed by the following expression where $C_n(t_n)$ is the n-th sub-frame correlation image, $I_n(t)$ is the incident light quantity in the n-th sub-frame, $g(t_n)$ is the reference signal, and Δt is a shutter release time period:

$$C_n(t_n) = \int_0^{\Delta t} I_n(t) g(t_n) dt \quad \text{Expression 5}$$

Figure 15:
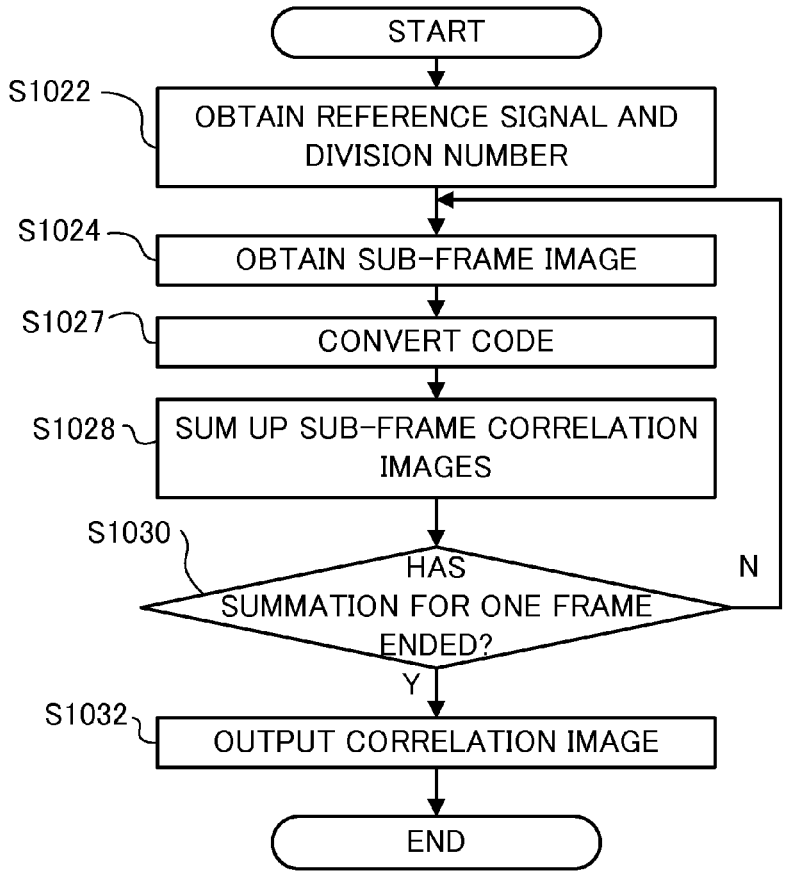
FIG. 15 is a flowchart for explaining an operation of a correlation image calculator illustrated in FIGS. 12A and 12B according to the second embodiment.

FIG. 15 is a flowchart for explaining an operation of the correlation image calculator 105A for one frame, and those steps which are the corresponding steps in FIG. 6 will be designated by the same reference numerals. FIG. 15 is different from FIG. 6 in that FIG. 15 has S1027 instead of S1026. Similar to FIG. 6, after S1022, the correlation image calculator 105A obtains the sub-frame correlation image from the image sensor 104 (S1024). Since the sub-frame image is the sub-frame correlation image in S1024, S1026 is not performed.

While the exposure controller 103A normalizes the reference signal g(t) between 0 and 1 in S1005, it is necessary to convert the obtained sub-frame correlation image in accordance with the reference signal since the original reference signal may have a negative value rather than a value between 0 and 1. Therefore, different from FIG. 11, the correlation image calculator 105A converts the obtained sub-frame correlation image in accordance with the reference signal g(t).

For example, the reference signal illustrated in FIG. 14 is made by normalizing between 0 and 1 the absolute value of the signal between −1 and 1. Thus, the correlation image calculator 105A inverts the code of the sub-frame correlation image $C_n(t_n)$ as follows for a sub-frame in which the reference $g(t_n)$ is negative:

$$C_n(t_n) = \begin{cases} C_n(t_n) & (g_n(t_n) \geq 0) \\ -C_n(t_n) & (g(t_n) < 0) \end{cases} \quad \text{Expression 6}$$

Next follows S1028 similar to FIG. 6. In this case, similar to FIG. 6, Expression 4 is applicable. Thereafter, S1030 and S1032 may be performed.

Even this embodiment may use a plurality of reference signals. For example, assume a signal in which a phase of the sinusoidal signal of FIG. 3 is shifted as illustrated in FIG. 7. However, it is impossible to simultaneously realize the light quantity modulation of the plurality of reference signal values. Therefore, the reference signal is selected in order, and the transmittance of the light quantity modulator is determined based upon the reference signal value at that time.

Figure 16:
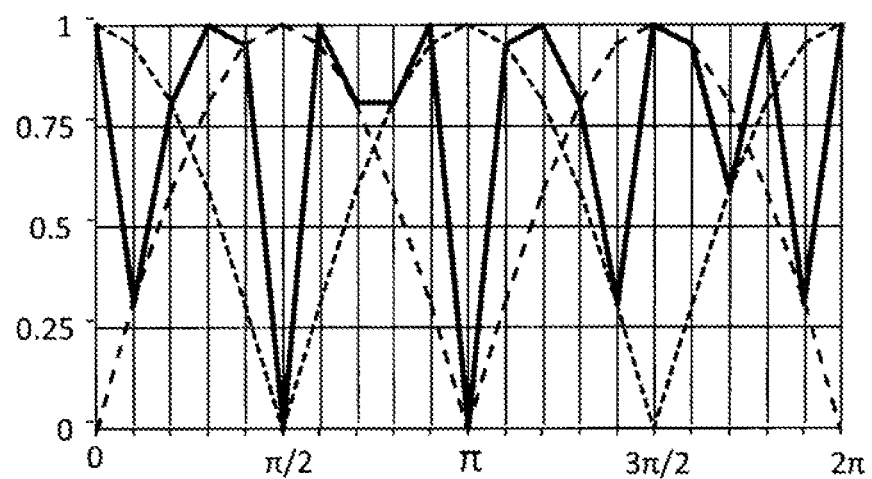
FIG. 16 is a view illustrating a time division synthesis of a plurality of reference signals according to the second embodiment.

FIG. 16 illustrates time-divided reference signals when three reference signals $g_1(t)=1$, $g_2(t)=\sin(\omega t)$, and $g_3(t)=\cos(\omega t)$ are input. For the first sub-frame, $g_1(t)=1$ (fixed value) is selected as the reference signal value. For the second sub-frame, $g_2(t)=\sin(\omega t)$ is selected as the reference signal value. For the third sub-frame, $g_3(t)=\cos(\omega t)$ is selected as the reference signal value. A solid line illustrates the synthesized reference signal value as a result of the repetitions of this procedure.

When a plurality of reference signals are input, a number of memories which corresponds to the number of types of reference signals are prepared, and sub-frame correlation images corresponding to the same reference signal are summed up and stored. As a result, a number of correlation images which corresponds to the number of reference signals can be calculated and output. It is similar to the first embodiment that a usual image can be output when g(t)=1 is set to the reference signal.

As discussed, this embodiment can obtain a correlation image without using a special image sensor disclosed in Japanese Patent No. 3643210, and prevent a cost increase of the image pickup apparatus.

The conversion method of the reference signal (normalization of the sine wave between 0 and 1) explained in the first embodiment is applicable to the second embodiment, and the conversion method of the reference signal (calculating an absolute value of the sine wave) explained in the second embodiment is applicable to the first embodiment.

Third Embodiment

Figure 17A:
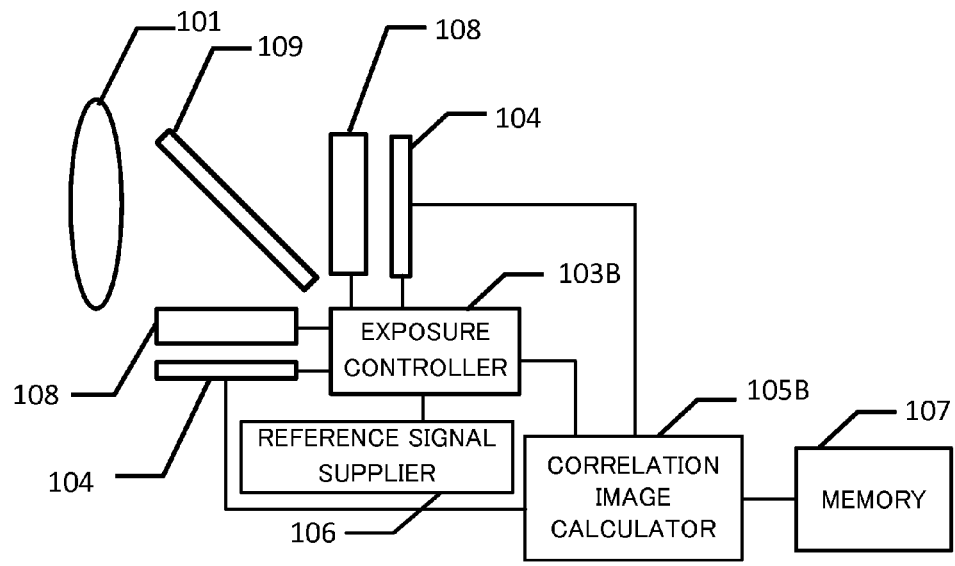
FIGS. 17A and 17B are block diagrams of image pickup apparatuses according to a third embodiment of the present invention.
Figure 17B:
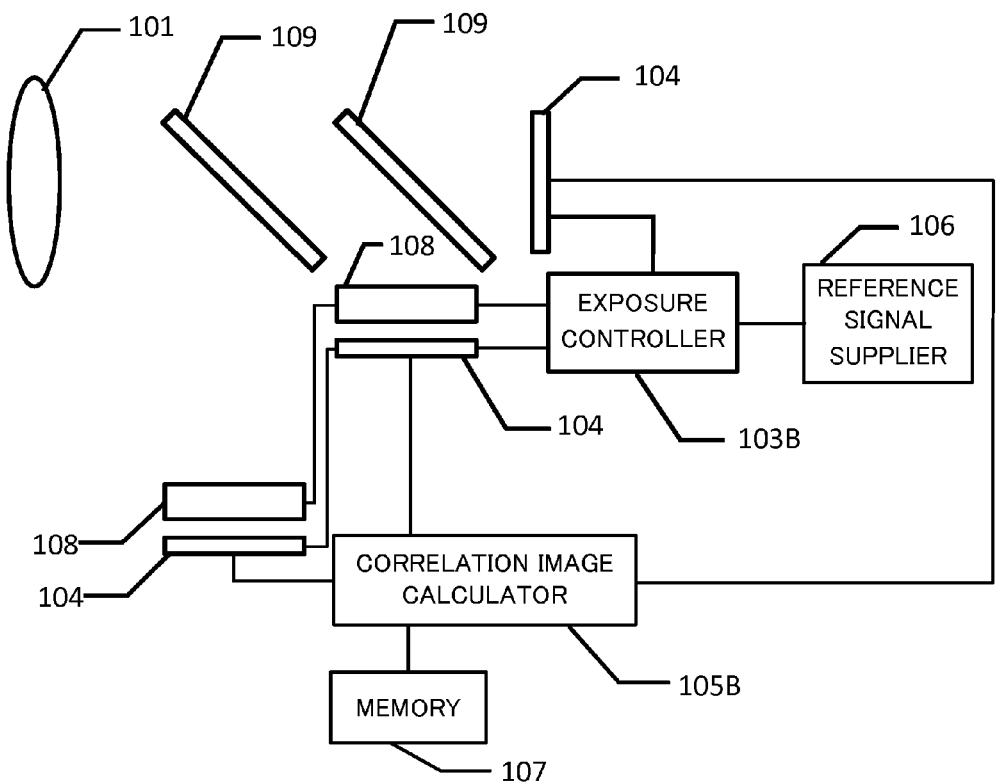

FIGS. 17A and 17B are block diagrams illustrating different structures of the image pickup apparatuses according to a third embodiment, and those elements which are the same as corresponding elements in FIGS. 1A, 1B, 12A, and 12B are designated by the same reference numerals. This embodiment is a suitable illustration in simultaneously obtaining both a normal intensity image and a correlation image or when correlation images are obtained with a plurality of types of reference signals.

The image pickup apparatus illustrated in FIG. 17A divides incident light from the image pickup optical system 101 into two beams (corresponding to the number of types of reference signals) having light quantities equal to each other utilizing a beam splitter 109.

The exposure controller 103B is structurally similar to the exposure controller 103A. However, the exposure controller 103B is different from the exposure controller 103A in that the exposure controller 103B independently controls two light quantity modulators 108 in accordance with the two reference signals, and the two image sensors 104 and the electronic shutters in the image sensors 104 are controlled so as to provide photoelectric conversions in accordance with controls of the two light quantity modulators 108.

The second embodiment modulates the reference signal through the time division when two reference signals are input, whereas this embodiment correlates the plurality of types of reference signals at the same time because there are light modulators 108 and the image sensors 104 corresponding to the type of the reference signal. Therefore, the exposure controller 103B controls the light quantity modulator 108 in synchronization with the sub-frame for each reference signal. The electronic shutters in the plurality of image sensors 104 are controlled for each sub-frame. Images captured through light quantity modulations and the shutter controls by the exposure controller 103B are output to the correlation image calculator 105B.

The correlation image calculator 105B is structurally similar to the correlation image calculator 105A, but the number of images input to the correlation image calculator 105B and the summing method are different. The correlation image calculator 105A receives an input from one image sensor 104 but the correlation image calculator 105B acquires images from two (or a plurality of) image sensors 104.

In the image addition (S1028) illustrated in FIG. 15, the correlation image calculator 105A determines the type of the reference signal time-divided for each sub-frame when there are a plurality of reference signals, and stores one input image in the different memory. On the other hand, the correlation image calculator 105B stores the plurality of input images in different memories without using the time division since the sub-frame correlation images corresponding to the types of the reference signals are obtained for each sub-frame.

The image pickup apparatus illustrated in FIG. 17B arranges two beam splitters 109 on the optical axis of the image pickup optical system 101, and divides the input light into three beams (corresponding to the number of types of reference signals added to 1). Thereby, the image pickup apparatus provides independent modulations, and acquires images.

In FIG. 17B, two light quantity modulators 108 are arranged, and the two image sensors 104 obtain the correlation images corresponding to the two reference signals. In addition, the image sensor 104 that receive the light that has transmitted the two beam splitters 109 outputs a normal intensity image (sub-frame image) that does not pass the light quantity modulator or is not used to form the correlation image. Alternatively, the light quantity modulator 108 may be provided before each of the three image sensors. The operation is similar to that of FIG. 10A expanded to the three types of input signals.

Two beam splitters are arranged in FIG. 17B, because the incident light is divided into three beams. In order to equalize the light quantities among the trichotomized beams, the first beam splitter 109 reflects a one-third of incident light quantity, allows the remaining two-thirds of incident light quantity to transmit through it, and the second beam splitter 109 may be a half-mirror.

As discussed, according to this embodiment, the plurality of light quantity modulators 108 and image sensors 104 are arranged and the correlation images corresponding to the plurality of reference signals can be simultaneously obtained. When one light quantity modulator 108 and one image sensor 104 are used with a plurality of reference signals, high-speed driving is required so as to obtain the correlation images corresponding to the sufficient division number. This embodiment can reduce the driving speeds of the light quantity modulator 108 and the image sensor 104.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-198194, filed Sep. 12, 2011 which is hereby incorporated by reference herein in its entirety.

What is claimed is:

1. An image pickup apparatus comprising:
    an image pickup element configured to provide a photoelectric conversion to an optical image formed by an image pickup optical system;
    a correlation image acquirer configured to obtain a first product between a pixel value of an image output from the image pickup element and a representative value of a first reference signal that fluctuates during an exposure time period for each of a plurality of divided time periods made by dividing the exposure time period by a predetermined division number such that each of the divided time periods is not more than a half of a period of the first reference signal and to obtain a second product between the pixel value and a representative value of a second reference signal that is a fixed value; and
    a correlation image calculator configured to obtain an output from the image pickup element and to calculate a first sum of the first product for the exposure time period as a first correlation image and a second sum of the second product for the exposure time period as a second correlation image.

2. The image pickup apparatus according to claim 1, wherein the correlation image calculator calculates the first sum by dividing the first product by the predetermined division number.

3. The image pickup apparatus according to claim 1, wherein
    the correlation image acquirer is configured to obtain a third product between the pixel value and a representative value of a third reference signal that fluctuates during the exposure time period for each of a plurality of divided time periods made by dividing the exposure time period such that each of the divided time periods is not more than a half of a period of the reference signal, the third reference signal being different from the first reference signal; and
    the correlation image calculator is configured to obtain an output from the image pickup element and to calculate a third sum of the third product for the exposure time period as a third correlation image.

4. An image pickup apparatus comprising:
- an image pickup element configured to provide a photoelectric conversion to an optical image formed by an image pickup optical system;
- a correlation image acquirer configured to obtain a product between a pixel value of an image output from the image pickup element and a representative value of a reference signal that fluctuates during an exposure time period for each of a plurality of divided time periods made by dividing the exposure time period by a predetermined division number;
- a correlation image calculator configured to obtain an output from the image pickup element and to calculate a sum of the product for the exposure time period as a correlation image;
- a shutter configured to determine an exposure dose upon the image pickup element; and
- an exposure controller configured to control opening and closing of the shutter so as to provide a shutter speed modulated by the representative value of the reference signal, and to control the image pickup element so as to provide the photoelectric conversion in synchronization with the opening and closing of the shutter,
- wherein the image output from the image pickup element corresponds to the product, and the exposure controller and the shutter serve as the correlation image acquirer.

5. An image pickup apparatus comprising:
- an image pickup element configured to provide a photoelectric conversion to an optical image formed by an image pickup optical system;
- a correlation image acquirer configured to obtain a product between a pixel value of an image output from the image pickup element and a representative value of a reference signal that fluctuates during an exposure time period for each of a plurality of divided time periods made by dividing the exposure time period by a predetermined division number;
- a correlation image calculator configured to obtain an output from the image pickup element and to calculate a sum of the product for the exposure time period as a correlation image;
- a light quantity modulator configured to change a light quantity of incident light upon the image pickup element; and
- an exposure controller configured to normalize between 0 and 1 a ratio of the light quantity of the incident light that has passed the light quantity modulator, to normalize the reference signal, and to control the light quantity element so as to modulate the ratio of the light quantity of the incident light by a representative value of a normalized reference signal,
- wherein the image output from the image pickup element corresponds to the product, and the exposure controller and the light quantity modulator serve as the correlation image acquirer.

6. The image pickup apparatus according to claim 5, wherein the normalized reference signal is a signal of an absolute value of the reference signal in which a maximum value of the signal of the absolute value is 1, and
- wherein the correlation image calculator inverts a code of the product corresponding to a minus of the normalized reference signal in calculating the correlation image.

7. An image pickup apparatus comprising:
- an image pickup element configured to provide a photoelectric conversion to an optical image formed by an image pickup optical system;
- a correlation image acquirer configured to obtain a product between a pixel value of an image output from the image pickup element and a representative value of a reference signal that fluctuates during an exposure time period for each of a plurality of divided time periods made by dividing the exposure time period by a predetermined division number;
- a correlation image calculator configured to obtain an output from the image pickup element and to calculate a sum of the product for the exposure time period as a correlation image;
- a beam splitter configured to split incident light by the number of types of reference signals;
- a plurality of light quantity modulators each corresponding to one of a plurality of image pickup elements corresponding to the plurality of types of reference signals, and each configured to change a light quantity of incident light upon a corresponding one of the image pickup elements; and
- an exposure controller configured to normalize between 0 and 1 a ratio of a light quantity of the incident light that has passed the light quantity modulator, to normalize between 0 and 1 a signal of an absolute value of the reference signal, and to control the light quantity modulators so as to modulate the ratio of the light quantity of the incident light by a representative value of a normalized reference signal,
- wherein the image output by each image pickup element corresponds to the product and the exposure controller and the light quantity modulators serve as the correlation image acquirer, and
- wherein the correlation image calculator inverts a code of the product corresponding to a minus of the normalized reference signal in calculating the correlation image.

8. The image pickup apparatus according to claim 7, wherein the beam splitter splits the incident light by the number of types of reference signals added to 1,
- wherein the number of image pickup elements is the number of types of reference signals added to 1, and
- wherein the image pickup element which the incident light enters without passing the light quantity modulator outputs the product that is not used to form the correlation image.

9. A method of controlling an image pickup apparatus, the method comprising the steps of:
- providing, by an image pickup element, a photoelectric conversion to an optical image formed by an image pickup optical system;
- obtaining, by a correlation image acquirer, a first product between a pixel value of an image output from the image pickup element and a representative value of a first reference signal that fluctuates during an exposure time period for each of a plurality of divided time periods made by dividing the exposure time period such that each of the divided time periods is not more than a half of a period of the first reference signal and obtaining a second product between the pixel value and a representative value of a second reference signal that is a fixed value; and
- obtaining, by a correlation image calculator, an output from the image pickup element and to calculate a first sum of the first product for the exposure time period as a first correlation image and a second sum of the second product for the exposure time period as a second correlation image.

10. A method of controlling an image pickup apparatus, the method comprising the steps of:
provicing, by an image pickup element, a photoelectric conversion to an optical image formed by an image pickup optical system;
obtaining, by a correlation image acquirer, a product between a pixel value of an image output from the image pickup element and a representative value of a reference signal that fluctuates during an exposure time period for each of a plurality of divided time periods made by dividing the exposure time period by a predetermined division number;
obtaining, by a correlation image calculator, an output from the image pickup element and to calculate a sum of the product for the exposure time period as a correlation image;
determining, by a shutter, an exposure dose upon the image pickup element; and
controlling, by an exposure controller, opening and closing of the shutter so as to provide a shutter speed modulated by the representative value of the reference signal, and to control the image pickup element so as to provide the photoelectric conversion in synchronization with the opening and closing of the shutter,
wherein the image output from the image pickup element corresponds to the product, and the exposure controller and the shutter serve as the correlation image acquirer.

11. A method of controlling an image pickup apparatus, the method comprising the steps of:
providing, by an image pickup element, a photoelectric conversion to an optical image formed by an image pickup optical system;
obtaining, by a correlation image acquirer, a product between a pixel value of an image output from the image pickup element and a representative value of a reference signal that fluctuates during an exposure time period for each of a plurality of divided time periods made by dividing the exposure time period by a predetermined division number;
obtaining, by a correlation image calculator, an output from the image pickup element and to calculate a sum of the product for the exposure time period as a correlation image;
changing, by a light quantity modulator, a light quantity of incident light upon the image pickup element; and
normalizing, by an exposure controller, between 0 and 1 a ratio of the light quantity of the incident light that has passed the light quantity modulator, to normalize the reference signal, and to control the light quantity element so as to modulate the ratio of the light quantity of the incident light by a representative value of a normalized reference signal,
wherein the image output from the image pickup element corresponds to the product, and the exposure controller and the light quantity modulator serve as the correlation image acquirer.

12. A non-transitory computer-readable storage medium storing a program which causes a computer to execute a process comprising the steps of:
providing, by an image pickup element, a photoelectric conversion to an optical image formed by an image pickup optical system;
obtaining, by a correlation image acquirer, a first product between a pixel value of an image output from the image pickup element and a representative value of a first reference signal that fluctuates during an exposure time period for each of a plurality of divided time periods made by dividing the exposure time period such that each of the divided time periods is not more than a half of a period of the first reference signal and obtaining a second product between the pixel value and a representative value of a second reference signal that is a fixed value; and
obtaining, by a correlation image calculator, an output from the image pickup element and to calculate a first sum of the first product for the exposure time period as a first correlation image and a second sum of the second product for the exposure time period as a second correlation image.

13. A non-transitory computer-readable storage medium storing a program which causes a computer to execute a process comprising the steps of:
providing, by an image pickup element, a photoelectric conversion to an optical image formed by an image pickup optical system;
obtaining, by a correlation image acquirer, a product between a pixel value of an image output from the image pickup element and a representative value of a reference signal that fluctuates during an exposure time period for each of a plurality of divided time periods made by dividing the exposure time period by a predetermined division number;
obtaining, by a correlation image calculator, an output from the image pickup element and to calculate a sum of the product for the exposure time period as a correlation image;
determining, by a shutter, an exposure dose upon the image pickup element; and
controlling, by an exposure controller, opening and closing of the shutter so as to provide a shutter speed modulated by the representative value of the reference signal, and to control the image pickup element so as to provide the photoelectric conversion in synchronization with the opening and closing of the shutter,
wherein the image output from the image pickup element corresponds to the product, and the exposure controller and the shutter serve as the correlation image acquirer.

14. A non-transitory computer-readable storage medium storing a program which causes a computer to execute a process comprising the steps of:
providing, by an image pickup element, a photoelectric conversion to an optical image formed by an image pickup optical system;
obtaining, by a correlation image acquirer, a product between a pixel value of an image output from the image pickup element and a representative value of a reference signal that fluctuates during an exposure time period for each of a plurality of divided time periods made by dividing the exposure time period by a predetermined division number;
obtaining, by a correlation image calculator, an output from the image pickup element and to calculate a sum of the product for the exposure time period as a correlation image;
changing, by a light quantity modulator, a light quantity of incident light upon the image pickup element; and
normalizing, by an exposure controller, between 0 and 1 a ratio of the light quantity of the incident light that has passed the light quantity modulator, to normalize the reference signal, and to control the light quantity element so as to modulate the ratio of the light quantity of the incident light by a representative value of a normalized reference signal, wherein the image output from the image pickup element corresponds to the product, and the exposure controller and the light quantity modulator serve as the correlation image acquirer.

* * * * *